United States Patent [19]

Pollak et al.

[11] Patent Number: 5,083,759
[45] Date of Patent: Jan. 28, 1992

[54] ANTI-KICKBACK DEVICE

[75] Inventors: Henry Pollak, Pottstown; Gordon V. Wells, Spring City, both of Pa.

[73] Assignee: American Machine & Tool Co., Royersford, Pa.

[21] Appl. No.: 469,618

[22] Filed: Jan. 24, 1990

[51] Int. Cl.$^5$ .............................................. B23Q 3/02
[52] U.S. Cl. .................................................. 269/134
[58] Field of Search ............... 269/135, 134, 126–129, 269/156; 83/451, 239, 237, 254 R, 254 MW

[56] References Cited

U.S. PATENT DOCUMENTS

| | | |
|---|---|---|
| 1,242,182 | 10/1917 | Hallas . |
| 1,402,893 | 1/1922 | Sahlin . |
| 1,938,337 | 12/1933 | Janiszewski . |
| 1,951,869 | 3/1934 | Janiszewski . |
| 1,977,462 | 10/1934 | Van Berkel . |
| 2,334,911 | 11/1943 | Drake . |
| 2,806,411 | 9/1957 | Backman . |
| 3,286,744 | 11/1966 | Stall et al. . |
| 3,495,867 | 2/1970 | Avery et al. . |
| 3,734,485 | 5/1973 | Klaus . |
| 3,741,517 | 6/1973 | Pogonowski ............... 269/129 |
| 3,785,635 | 1/1974 | Lassy et al. . |
| 3,856,292 | 12/1974 | Merola . |
| 4,043,547 | 8/1977 | Glomb et al. . |
| 4,114,868 | 9/1978 | Smith . |
| 4,236,430 | 12/1980 | Hitt . |
| 4,261,558 | 4/1981 | Carossino . |
| 4,340,211 | 7/1982 | Chiappetti . |
| 4,779,503 | 10/1988 | Mitchell . |

FOREIGN PATENT DOCUMENTS

| | | |
|---|---|---|
| 1252495 | 12/1960 | France . |
| 132378 | 4/1929 | Switzerland . |
| 155841 | 9/1932 | Switzerland ............... 269/126 |

*Primary Examiner*—Robert C. Watson
*Attorney, Agent, or Firm*—Panitch, Schwarze Jacobs & Nadel

[57] ABSTRACT

An apparatus for inhibiting movement of a workpiece comprises a bed, a pair of opposed vise jaws associated with and extending from the bed, each of the jaws having a gripping surface and at least one of the jaws being movable for gripping and releasing the workpiece positioned between the jaws, and a movable projection member rotatably disposed in a recess in the gripping surface of one of the jaws, where the projection member is extendable outwardly in a direction generally transverse to the gripping surface between the pair of jaws for being positioned above the workpiece when the workpiece is positioned between the jaws without exerting a substantial force on the workpiece to inhibit fly-away movement of the workpiece. In addition, a method for inhibiting fly-away movement of a workpiece using the apparatus of the present invention comprises placing the workpiece on the bed between the jaws, moving the movable jaw to a position to grip the workpiece between the gripping surfaces of the jaws and positioning the projection member to a position above the workpiece without exerting a substantial force on the workpiece.

4 Claims, 1 Drawing Sheet

ANTI-KICKBACK DEVICE

FIELD OF THE INVENTION

The present invention relates to an apparatus for inhibiting movement, specifically fly-away movement, of a workpiece held by a pair of vise jaws. The invention is also directed to a method for inhibiting fly-away movement of a workpiece using the apparatus disclosed herein.

BACKGROUND OF THE INVENTION

A significant problem in machinery vises is the inability, for one reason or another, to clamp and hold workpieces safely. This is particularly true in those instances where the workpiece is dislodged during operation of the machinery. For example, in the operation of a powered horizontal metal cutting bandsaw, when the workpiece comprises sheet metal, angle iron or the like and the blade being used in machine is too coarse for the application, it is not unusual for a tooth of the blade to get caught in the workpiece. Rather than cutting the workpiece, the blade dislodges it from the vise, often throwing the workpiece through the air for a considerable distance at high velocity. This condition is generally known as "kickback" or "fly-away" of the workpiece and serious injury to the operator or other persons in the vicinity of the machinery may result.

Various attempts in the prior art to provide a vise capable of safely securing a workpiece have not proven adequate to prevent accidental kickback or fly-away of a workpiece during operation For example, U.S. Pat. Nos. 1,125,207; 1,242,182; 1,938,337; 1,951,869; 2,334,911; 2,806,411; 3,785,635; 3,856,292; 4,114,868; 4,261,558; French Patent No. 1,252,495 and Swiss Patent No. 132,378 disclose various configurations for vise or clamping devices, whereby finger-like projections and other movable projections engage a workpiece, typically on the side, so as to produce lateral forces to hold or clamp the workpiece in place. None of these prior art references, however, provide a safety feature to prevent kickback or fly-away of a workpiece.

U.S. Pat. Nos. 3,286,744; 3,734,485; 4,236,430 and 4,340,211 disclose various vise or clamping devices, whereby finger-like projections or other movable projections engage or clamp a workpiece on the top of the workpiece to hold the workpiece in a vise apparatus. However, these prior art references provide complex and expensive means for exerting downward forces to clamp a workpiece downwardly toward the vise bed. None of these references provide means for inhibiting or preventing kickback or fly-away movement of a workpiece in the event that the workpiece becomes dislodged from the vise.

In view of the disadvantages inherent in the prior art, it would be desirable to provide an apparatus for safely inhibiting fly-away movement of a workpiece which is relatively simple and inexpensive to manufacture and operate.

SUMMARY OF THE INVENTION

Briefly stated, the present invention is directed to an apparatus for inhibiting movement of a workpiece comprising a bed, a pair of opposed vise jaws associated with and extending from the bed where each of the jaws has gripping surface and at least one of jaws is movable for gripping and releasing the workpiece positioned between the jaws, and a movable projection member which is rotatably disposed in a recess in the gripping surface of one of the jaws. The movable projection member is extendable outwardly in a direction generally transverse to the gripping surface between the pair of jaws for being positioned above the workpiece when the workpiece is positioned between the jaws. This projection member serves to inhibit fly-away movement of the workpiece without exerting a substantial force on the workpiece. In addition, the present invention is directed to a related method for inhibiting fly-away movement of a workpiece.

BRIEF DESCRIPTION OF THE DRAWING

The foregoing summary, as well as the following detailed description of preferred embodiments of the invention, will be better understood when read in conjunction with the appended drawing. For the purpose of illustrating the invention, there is shown in the drawing embodiments which are presently preferred, it being understood, however, that the invention is not limited to the specific methods and instrumentalities disclosed. In the drawing.

DESCRIPTION OF PREFERRED EMBODIMENTS

Figure 1:
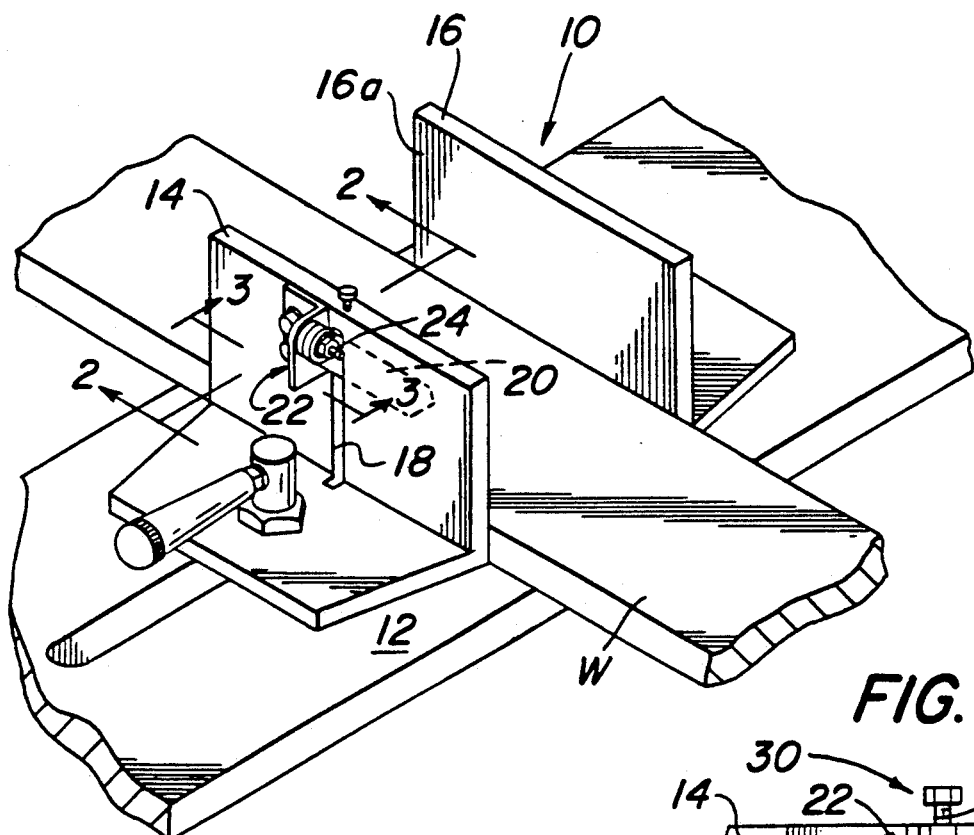
FIG. 1 is a generalized isometric view showing the apparatus according to the present invention.
Figure 3:
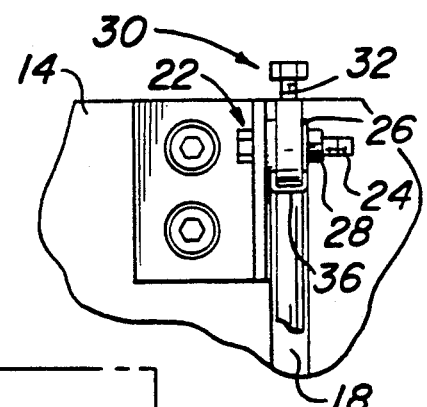
FIG. 3 is an enlarged partial side elevational view along line 3—3 in FIG. 1.

Referring to the drawing, wherein like numerals indicate like elements throughout, there is shown in FIG. 1 a perspective view showing the apparatus or vise 10 according to the present invention. The apparatus comprises a supporting vise bed 12 and a pair of opposed vise jaws 14, 16 associated with and extending from the bed 12. The bed 12 and pair of vise jaws 14, 16 may comprise any conventional vise apparatus known in the art but preferably comprises a vise having two opposing jaws 14, 16 wherein at least one of the vise jaws is movable (14 in FIG. 1) with respect to the other vise jaw for gripping and releasing a workpiece W positioned between the jaws. The vise 10 is preferably formed of a high strength material, such as iron or steel, although other high strength materials may be used. Preferably also, each of the vise jaws 14, 16 is provided with a suitably faced gripping surface 14a, 16a to assist in firmly gripping the workpiece W to prevent relative movement of the workpiece W with respect to the vise 10. The gripping surface 14a, 16a may comprise a smooth surface or, alternatively, may comprise a roughened or textured surface or a surface having a set of gripping teeth, for example. The gripping surface desired may be readily determined by on skilled in the art in view of the present invention depending upon the particular use for the apparatus 10.

In accordance with the present invention, the apparatus 10 further comprises a movable projection member 20 provided in association with one of the vise jaws (14 in the FIG. 1). The projection member 20 is disposed in a recess 18 in the gripping surface of the jaw 14 so that it is capable of being rotated relative to the vise jaw 14. The projection member 20 is rotatable so that it may be extended outwardly in a direction generally transverse to the gripping surface 14a between the pair of jaws 14, 16. Preferably, the projection member 20 rotates so that it extends outwardly in a direction substantially perpendicular to the gripping surface 14a, as illustrated in FIG. 1, although one skilled in the art will appreciate that the projection member 20 may extend outwardly in a different direction, such as to form an acute angle relative to the gripping surface 14a in accordance with the present invention.

The projection member 20 is preferably formed of a high strength material, such as iron or steel. The projection member 20 may be attached to the vise jaw 14 using methods known in the art for rotatably attaching one structural member to another. For example, it is preferred that the projection member 20 is attached to the vise jaw 14 by a pivot assembly 22 comprising a pivot pin or bolt 24, a lockwasher 26 and a hex nut 28, as illustrated in FIG. 1.

The projection member 20 should be disposed in the recess 18 of the vise jaw 14 so that the projection member 20 can extend outwardly for being positioned above the workpiece W when the workpiece W is positioned between the jaws 14, 16. The projection member 20 of the present invention is rotatable to a limiting point or first position, where the projection member 20 cannot rotate further in a direction generally away from the bed, serving to inhibit fly-away movement of the workpiece W.

Generally, as illustrated in FIG. 1, rotation of the projection member 20 past the first position is ultimately prevented by a wall of the recess 18. However, it may be desired in accordance with the present invention to provide the apparatus 10 with an adjustable first position to more easily accommodate various workpiece sizes and configurations. The first position may be adjusted using, for example, set screw means 30 disposed in one of the vise jaws in association with the projection member 20. As illustrated in FIG. 1, for example, set screw means 30 preferably comprises a set screw 32 which may be threaded at least partially through a threaded aperture 34 in the vise jaw 14 so that the set screw 32 extends through the vise jaw 14, intersecting the recess 18 and engaging the projection member 20. It will be understood by one skilled in the art in view of this disclosure, that the set screw 32 may be threadingly adjusted to allow the first position of the projection member to be adjusted with respect to the bed 12 onto or above a workpiece W on the bed to a desired first position.

Further in accordance with the present invention, it may be desired to provide biasing means 36 to facilitate positioning of the projection member 20. The biasing means 36 is preferably provided to urge the projection member 20 toward the first position. One skilled in the art will appreciate in view of the present specification that the biasing means 36 will urge the projection member 20 in a direction generally away from the bed 12 when the projection member 20 is rotatably disposed about an axis generally parallel to the bed 12 of the apparatus 10. It is presently preferred that the biasing means 36 comprises a torsion spring, which may be disposed generally concentrically with the pivot assembly 22, although one skilled in the art will appreciate that other biasing means, such as spring clips or coil springs may be used in accordance with the present invention to urge the projection member 20 toward the first position.

Figure 2:
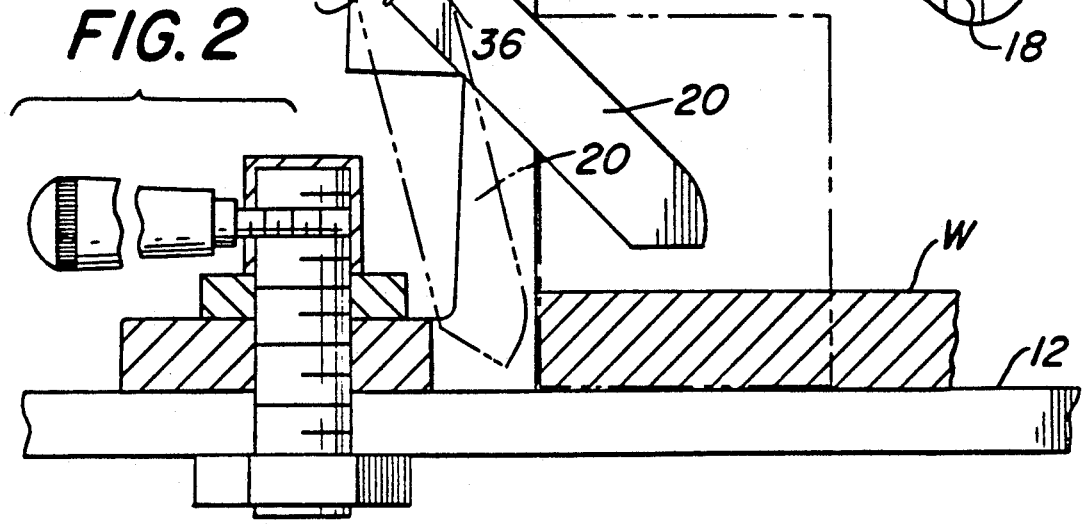
FIG. 2 is an enlarged cross-sectional view along line 2—2 in FIG. 1 showing the projection member and pivot assembly.

The projection member 20 is also rotatable from the first position to a second position wherein the projection member 20 is positioned substantially within the recess 18 as shown (shadowed) in FIG. 2. It will be appreciated by one skilled in the art that rotation of the projection member 20 to a position substantially within the recess 18 allows the projection member 20 to collapse or be positioned out of the way of a larger workpiece W where it is desired to not use the projection member 20 for anti-kickback purposes.

In operation, kickback or fly-away movement of a workpiece may be inhibited using the apparatus according to the present invention by placing a workpiece W on the bed 12 between the jaws 14, 16. The position of the projection member 20 is adjusted (utilizing the set screw 32) depending upon the size of the workpiece W. The jaws 14, 16 are adjusted to grip the workpiece W between the gripping surfaces 14a, 16a and the projection member 20 is positioned above the workpiece W, serving to inhibit fly-away movement of the workpiece.

The projection member 20 is positioned above the workpiece W either in engagement with a surface of the workpiece W or in close proximity to a surface of the workpiece W. The projection member 20 need not exert any direct force on the workpiece to inhibit fly-away movement of the workpiece. It will be appreciated by one of skill in the art in view of the present disclosure that positioning the projection member 20 in accordance with the present invention serves to halt or retard errant movement of a workpiece by substantially blocking or otherwise interfering with the fly-away movement of the workpiece W, such as when the workpiece W is dislodged during machining thereof. It should be understood, therefore, that the primary means of gripping the workpiece is accomplished by the pair jaws 14, 16, although it will be further understood that the projection member 20 may also serve to hold the workpiece W in place.

From the foregoing description, it can been seen that the present invention comprises an anti-kickback device for preventing or inhibiting fly-away movement of a workpiece. It will be appreciated by those skilled in the art that the present invention may be embodied in other specific forms without departing from the spirit or the essential attributes thereof and, accordingly, reference should be made to the appended claims, rather than to the foregoing specification as indicating the scope of the invention.

We claim:

1. An apparatus for inhibiting movement of a workpiece comprising a bed, a pair of opposed vise jaws associated with and extending from the bed, each of the jaws having a gripping surface and at least one of the jaws being movable for gripping and releasing the workpiece positioned between the jaws, and a movable projection member rotatably disposed within a recess in the gripping surface of one of said jaws, the projection member being extendable outwardly between the jaws in a direction generally transverse to the gripping surfaces for being positioned above the workpiece without exerting a substantial force on the workpiece when the workpiece is positioned between the jaws, the projection member serving to inhibit fly-away movement of the workpiece wherein the projection member is rotatable from an adjustable firs position, wherein the projection member extends generally transverse to the gripping surfaces of the jaws to a second position, wherein the projection member is positioned substantially within the recess.

2. The apparatus according to claim 1, wherein set crew means disposed in said one of the vise jaws is provided for adjustably establishing the first position of the projection member with respect to the bed.

3. The apparatus according to claim 1, further comprising biasing means urging the projection member toward the first position.

4. The apparatus according to claim 3, wherein the biasing means comprises a torsion spring.

* * * * *